United States Patent
Kim et al.

(10) Patent No.: US 9,105,371 B2
(45) Date of Patent: *Aug. 11, 2015

(54) CATHODE ACTIVE MATERIAL AND LITHIUM SECONDARY BATTERY COMPRISING THE SAME

(71) Applicant: LG CHEM, LTD., Seoul (KR)

(72) Inventors: Daehong Kim, Daejeon (KR); Jihyun Kim, Daejeon (KR); SeongMin Lee, Seoul (KR)

(73) Assignee: LG CHEM, LTD., Seoul (KR)

( * ) Notice: Subject to any disclaimer, the term of this patent is extended or adjusted under 35 U.S.C. 154(b) by 168 days.

This patent is subject to a terminal disclaimer.

(21) Appl. No.: 13/864,727

(22) Filed: Apr. 17, 2013

(65) Prior Publication Data

US 2013/0313470 A1    Nov. 28, 2013

(30) Foreign Application Priority Data

Apr. 17, 2012 (KR) .......................... 10-2012-0039608

(51) Int. Cl.
| | | |
|---|---|---|
| *H01B 1/08* | (2006.01) | |
| *H01M 4/505* | (2010.01) | |
| *H01M 4/525* | (2010.01) | |
| *H01M 4/36* | (2006.01) | |
| *H01M 4/131* | (2010.01) | |
| *H01M 4/1315* | (2010.01) | |
| *H01M 4/485* | (2010.01) | |
| *H01M 10/0525* | (2010.01) | |

(52) U.S. Cl.
CPC ................ *H01B 1/08* (2013.01); *H01M 4/131* (2013.01); *H01M 4/364* (2013.01); *H01M 4/505* (2013.01); *H01M 4/525* (2013.01); *H01M 4/1315* (2013.01); *H01M 4/485* (2013.01); *H01M 10/0525* (2013.01); *Y02E 60/122* (2013.01); *Y02T 10/7011* (2013.01)

(58) Field of Classification Search
CPC ..... H01M 4/505; H01M 4/525; H01M 4/364; H01M 4/131; H01B 1/08
USPC ................................ 252/500–519.15, 182.1; 429/218.1–229, 149–160
See application file for complete search history.

(56) References Cited

U.S. PATENT DOCUMENTS

| | | | | |
|---|---|---|---|---|
| 7,713,655 | B2 * | 5/2010 | Ha et al. ........................ | 429/99 |
| 8,026,008 | B2 * | 9/2011 | Kim et al. ..................... | 429/338 |
| 8,088,514 | B2 * | 1/2012 | Takami et al. ............. | 429/218.1 |
| 8,268,489 | B2 * | 9/2012 | Jeon et al. ..................... | 429/338 |
| 2007/0202405 | A1 * | 8/2007 | Shizuka et al. ............ | 429/231.3 |
| 2010/0099031 | A1 * | 4/2010 | Kato et al. ..................... | 429/330 |
| 2010/0323242 | A1 * | 12/2010 | Choi et al. ..................... | 429/217 |
| 2011/0136011 | A1 * | 6/2011 | Yura et al. ..................... | 429/224 |
| 2011/0165465 | A1 * | 7/2011 | Kim et al. .................. | 429/231.5 |
| 2011/0206999 | A1 * | 8/2011 | Jeon et al. ..................... | 429/338 |
| 2013/0320256 | A1 * | 12/2013 | Kim et al. .................. | 252/182.1 |

\* cited by examiner

*Primary Examiner* — Mark Kopec
*Assistant Examiner* — Matthew R Diaz
(74) *Attorney, Agent, or Firm* — Birch, Stewart, Kolasch & Birch, LLP

(57) ABSTRACT

Disclosed is a cathode active material (and secondary battery comprising the same) comprising a combination of a lithium manganese composite oxide having a spinel structure represented by the following Formula 1 with a lithium nickel composite oxide represented by the following Formula 2, the cathode active material having a broad potential region at 3.0 to 4.8V upon initial charge:

$$Li_xM_yMn_{2-y}O_{4-z}A_z \qquad (1)$$

wherein $0.9 \leq x \leq 1.2$, $0<y<2$, and $0 \leq z<0.2$;
M is at least one element selected from the group consisting of Al, Mg, Ni, Co, Fe, Cr, V, Ti, Cu, B, Ca, Zn, Zr, Nb, Mo, Sr, Sb, W, Ti and Bi; and
A is at least one monovalent or bivalent anion, and $$Li_{1+y'}Ni_zM'_{1-z}O_{2-z''}A'_{z''} \qquad (2)$$

wherein $0 \leq y' \leq 0.1$, $0.5 < z' \leq 0.9$, and $0 \leq z'' < 0.2$;
M' is at least one selected from the group consisting of elements stable for 6-coordination, including Mn, Co, Mg and Al; and
A' is at least one monovalent or bivalent anion.

10 Claims, No Drawings

CATHODE ACTIVE MATERIAL AND LITHIUM SECONDARY BATTERY COMPRISING THE SAME

TECHNICAL FIELD

The present invention relates to a cathode active material and a lithium secondary battery comprising the same. More specifically, the present invention relates to a cathode active material which comprises a combination of specific two types of compounds and thus has a broad potential region at 3.0 to 4.8V upon initial charge, and a lithium secondary battery comprising the same.

BACKGROUND ART

Depletion of fuel cells has brought about a great increase in price of energy sources and increased interest in environmental pollution. Eco-friendly alternative energy sources are a necessity for the next generation. In this regard, a great deal of research into power production methods such as nuclear energy, sunlight, wind power and tidal power is underway and power storage devices for efficiently utilizing the produced energy also attract much attention.

In particular, regarding lithium secondary batteries, an increase in technological development and demand associated with mobile equipment has led to a sharp increase in demand for lithium secondary batteries as energy sources. Recently, use of lithium secondary batteries as power sources of electric vehicles (EVs) and hybrid electric vehicles (HEVs) has become popularized and usage thereof is expanding to applications such as auxiliary power supply through grid-implementation.

A conventional lithium secondary battery generally utilizes a lithium metal composite oxide for a cathode and a graphite-based compound for an anode. On the other hand, recently, rather than conventional carbon-based anode materials, a great deal of research associated with anode materials obtained through lithium alloy reactions using silicon (Si) and tin (Sn) and lithium titanium oxides is underway.

Lithium titanium oxide is known as a zero-strain material that suffers minimal structural deformation during charge/discharge, exhibits considerably superior lifespan, does not cause generation of dendrites and has considerably superior safety and stability.

However, lithium titanium oxide has a limitation of insufficient capacity as compared to conventional carbon-based anode materials, although it has a theoretical capacity of 175 mAh/g and an improved capacity to a level of 160 to 170 mAh/g to date.

Accordingly, there is an increasing need for methods capable of improving performance of secondary batteries by providing desired capacity and power, in spite of using lithium titanium oxide as an anode active material.

DISCLOSURE

Technical Problem

Therefore, the present invention has been made to solve the above and other technical problems that have yet to be resolved.

As a result of a variety of extensive and intensive studies and experiments, the present inventors discovered that a battery having high capacity and high power can be obtained by using a cathode active material prepared by combining a lithium manganese composite oxide having a specific spinel structure with a lithium nickel composite oxide. The present invention has been completed, based on this discovery.

Technical Solution

In accordance with one aspect of the present invention, provided is a cathode active material comprising a combination of lithium manganese composite oxide with a spinel structure represented by the following Formula 1 with lithium nickel composite oxide represented by the following Formula 2, the cathode active material having a broad potential region (potential plateau) at 3.0 to 4.8V upon initial charge:

$$Li_xM_yMn_{2-y}O_{4-z}A_z \quad (1)$$

wherein $0.9 \leq x \leq 1.2$, $0 < y < 2$, and $0 \leq z < 0.2$;

M is at least one element selected from the group consisting of Al, Mg, Ni, Co, Fe, Cr, V, Ti, Cu, B, Ca, Zn, Zr, Nb, Mo, Sr, Sb, W, Ti and Bi; and A is at least one monovalent or bivalent anion,

$$Li_{1+y'}Ni_{z'}M'_{1-z'}O_{2-z''}A'_{z''} \quad (2)$$

wherein $0 \leq y' \leq 0.1$, $0.5 < z' \leq 0.9$, and $0 \leq z'' < 0.2$;

M' is at least one selected from the group consisting of elements stable for 6-coordination, including Mn, Co, Mg and Al; and A' is at least one monovalent or bivalent anion.

The cathode active material according to the present invention comprises a combination of lithium manganese composite oxide having a predetermined spinel structure with lithium nickel composite oxide, thus maintaining high voltage during charge and discharge of batteries and exerting superior lifespan and power.

In the present invention, the oxide of Formula 1 may be represented by the following Formula 3:

$$Li_xNi_yMn_{2-y}O_4 \quad (3)$$

wherein $0.9 \leq x \leq 1.2$, and $0.4 \leq y \leq 0.5$.

More specifically, the oxide of Formula 3 is $LiNi_{0.5}Mn_{1.5}O_4$ or $LiNi_{0.4}Mn_{1.6}O_4$.

In the present invention, the oxide of Formula 2 may be represented by the following Formula 4:

$$LiNi_aMn_bCo_cO_2 \quad (4)$$

wherein $0.5 < a \leq 0.9$, $0 < b \leq 0.5$, $0 < c \leq 0.5$, $a+b+c=1$, and $c \leq b$.

Secondary particles of the oxide of Formula 1 have a mean particle diameter (D50) of 2 to 30 µm, specifically 4 to 20 µm.

In the present invention, the mean particle diameter of the oxide means specifically a particle diameter of a secondary particle, i.e., an agglomerate formed of a plurality of particles (primary particles). Oxide units of the cathode active material agglomerate depending on set conditions of the production process to form an agglomerate and this agglomerate exerts active material properties per se. Accordingly, the mean particle diameter of the oxide means a particle diameter of the agglomerate.

The primary particle of the oxide may be varied depending on the preparation method of the oxide and the oxide of Formula 2 is provided as the secondary particle formed of agglomerated primary particles. When considering the shape of agglomerates, for example, the primary particle of the oxide of Formula 2 has a mean particle diameter of 0.01 to 10 µm, specifically 0.1 to 5 µm and the secondary particle thereof has a mean particle diameter of 2 to 30 µm, specifically 4 to 20 µm.

The preparation process of this oxide places a limit on increase in particle size. When the particle size is excessively high, efficiency per battery weight is deteriorated. Accordingly, the particle size is preferably within the range defined above.

In the present invention, a mix ratio of the two composite oxides may be a weight ratio of 50:50 to 99:1 and specifically, 80:20 to 95:5. The mix ratio may be an optimal range to exert desired levels of effects. In particular, when the composite oxide of Formula 2 is present in an excessively low amount, desired capacity and power levels cannot be disadvantageously obtained.

The present invention provides a secondary battery comprising the cathode active material.

Specifically, the secondary battery may comprise a lithium metal oxide represented by the following Formula 5 as an anode active material:

$$Li_aM'_bO_{4-c}A_c \quad (5)$$

wherein M' is at least one element selected from the group consisting of Ti, Sn, Cu, Pb, Sb, Zn, Fe, In, Al and Zr;

a and b are determined according to an oxidation number of M' within ranges of 0.1≤a≤4 and 0.2≤b≤4;

c is determined according to an oxidation number of A within a range of 0≤c<0.2; and A is at least one monovalent or bivalent anion.

The lithium metal oxide is represented by the following Formula 6:

$$Li_aTi_bO_4 \quad (6)$$

wherein 0.5≤a≤3 and 1≤b≤2.5.

The lithium metal oxide may be $Li_{1.33}Ti_{1.67}O_4$ or $LiTi_2O_4$.

As compared to graphite, the lithium titanium oxide has a higher potential than lithium, and does not cause precipitation of reaction products with an electrolyte and lithium on the interface, thus exerting superior safety. However, when lithium titanium oxide is used in combination with conventional cathode active materials such as lithium cobalt oxide, since the potential thereof is about 1.5V higher than that of lithium, fabricated battery cells have a decreased discharge voltage of about 2.4V, a similar theoretical capacity to graphite, of 175 mAh/g, and limited improvement in energy density.

Accordingly, in the present invention, the secondary battery maintains a high voltage and thus exerts superior capacity and power by using the cathode active material defined above, in spite of using lithium titanium oxide as an anode active material. A method for preparing the oxide as defined above is well-known in the art and a detailed explanation thereof is thus omitted.

The secondary battery according to the present invention comprises a cathode produced by applying a mixture containing a cathode active material, a conductive material and a binder to a cathode current collector, followed by drying and pressing, and an anode produced by the same method as the cathode. In this case, the mixture may further comprise a filler, as necessary.

The cathode current collector is generally fabricated to have a thickness of 3 to 500 µm. There is no particular limit as to the cathode current collector, so long as it has suitable conductivity without causing adverse chemical changes in the fabricated battery. Examples of the cathode current collector include stainless steel, aluminum, nickel, titanium, sintered carbon, and aluminum or stainless steel surface-treated with carbon, nickel, titanium or silver. If necessary, these current collectors may be processed to form fine irregularities on the surface thereof so as to enhance adhesion to the cathode active materials. In addition, the current collectors may be used in various forms including films, sheets, foils, nets, porous structures, foams and non-woven fabrics.

The conductive material is commonly added in an amount of 1 to 50% by weight, based on the total weight of the mixture comprising the cathode active material. Any conductive material may be used without particular limitation so long as it has suitable conductivity without causing adverse chemical changes in the battery. Examples of conductive materials include: graphite such as natural graphite or artificial graphite; carbon black such as carbon black, acetylene black, Ketjen black, channel black, furnace black, lamp black and thermal black; conductive fibers such as carbon fibers and metallic fibers; metallic powders such as carbon fluoride powders, aluminum powders and nickel powders; conductive whiskers such as zinc oxide and potassium titanate; conductive metal oxides such as titanium oxide; and conductive materials such as polyphenylene derivatives.

The binder is a component enhancing binding of an electrode active material to the conductive material and the current collector. The binder is commonly added in an amount of 1 to 50% by weight, based on the total weight of the mixture comprising the cathode active material. Examples of the binder include polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene propylene diene terpolymer (EPDM), sulfonated EPDM, styrene butadiene rubbers, fluororubber and various copolymers.

The filler is a component optionally used to inhibit expansion of the electrode. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

The anode current collector is generally fabricated to have a thickness of 3 to 500 µm. There is no particular limit as to the anode current collector, so long as it has suitable conductivity without causing adverse chemical changes in the fabricated battery. Examples of the anode current collector include copper, stainless steel, aluminum, nickel, titanium, sintered carbon, and copper or stainless steel surface-treated with carbon, nickel, titanium or silver, and aluminum-cadmium alloys. Similar to the cathode current collector, if necessary, the anode current collector may be processed to form fine irregularities on the surface thereof so as to enhance adhesion to the anode active materials. In addition, the current collectors may be used in various forms including films, sheets, foils, nets, porous structures, foams and non-woven fabrics.

In addition to the material defined above, other examples of the anode active material include: carbon such as non-graphitized carbon and graphitized carbon; metal composite oxides such as $Li_xFe_2O_3$ (0≤x≤1), $Li_xWO_2$ (0≤x≤1) and $Sn_xMe_{1-x}Me'_yO_z$ (Me: Mn, Fe, Pb, Ge; Me': Al, B, P, Si, Group I, II and III elements of the Periodic Table, halogen atoms; 0<x≤1; 1≤y≤3; and 1≤z≤8); lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni based materials; and titanium oxides. Specifically, lithium titanium oxide defined above may be used.

The secondary battery may have a structure in which a lithium salt-containing electrolyte is impregnated into an electrode assembly having a structure in which a separator is interposed between the cathode and the anode.

The separator is interposed between the cathode and the anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and the electrolyte.

The lithium salt-containing, non-aqueous electrolyte is composed of an electrolyte and a lithium salt. As the electrolyte, a non-aqueous organic solvent, an organic solid electrolyte or an inorganic solid electrolyte may be utilized.

Examples of the non-aqueous organic solvent include non-protic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ethers, methyl propionate and ethyl propionate.

Examples of the organic solid electrolyte include polyethylene derivatives, polyethylene oxide derivatives, polypropylene oxide derivatives, phosphoric acid ester polymers, poly-agitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imides.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further contain halogen-containing solvents such as carbon tetrachloride and ethylene trifluoride. Further, in order to improve high-temperature storage characteristics, the non-aqueous electrolyte may further contain carbon dioxide gas or the like and may further contain fluoro-ethylene carbonate (FEC), propene sulfone (PRS) and the like.

For example, the lithium salt-containing non-aqueous electrolyte can be prepared by adding a lithium salt such as $LiPF_6$, $LiClO_4$, $LiBF_4$, and $LiN(SO_2CF_3)_2$, to a mixed solvent of a cyclic carbonate such as EC or PC as a highly dielectric solvent and a linear carbonate such as DEC, DMC or EMC as a low-viscosity solvent.

The present invention provides a battery module comprising the secondary battery as a unit battery and a battery pack comprising the battery module.

The battery pack may be used as a power source for medium to large devices requiring high-temperature stability, long cycle properties and high rate properties.

Preferably, examples of the medium to large devices include, but are not limited to, power tools powered by battery-driven motors; electric vehicles including electric vehicles (EVs), hybrid electric vehicles (HEVs) and plug-in hybrid electric vehicles (PHEVs); electric two-wheeled vehicles including electric bikes (E-bikes) and electric scooters (E-scooters); electric golf carts; power storage systems and the like.

Effects of the Invention

As apparent from the fore-going, the cathode active material according to the present invention comprises a combination of a lithium manganese composite oxide having a predetermined spinel structure with a lithium nickel composite oxide, thus exerting superior lifespan and power, and exhibiting considerably improved capacity, although lithium titanium oxide is used as an anode active material.

DETAILED DESCRIPTION OF THE INVENTION

Now, the present invention will be described in more detail with reference to the following examples. These examples are provided only to illustrate the present invention and should not be construed as limiting the scope and spirit of the present invention.

EXAMPLE 1

An oxide of $LiNi_{0.5}Mn_{1.5}O_4$ was mixed with an oxide of $LiNi_{0.7}Mn_{0.2}Co_{0.1}O_2$ at a weight ratio of 90:10 to prepare a cathode active material and 90% by weight of the cathode active material, 5% by weight of Super-P (conductive material) and 5% by weight of PVdF (binder) were added to NMP to prepare a cathode mix.

COMPARATIVE EXAMPLE 1

A cathode mix was prepared in the same manner as in Example 1, except that only $LiNi_{0.5}Mn_{1.5}O_4$ was used as the cathode active material.

EXPERIMENTAL EXAMPLE 1

The cathode mixes prepared in Example 1 and Comparative Example 1 were applied to an aluminum current collector to produce a cathode for secondary batteries. 90% by weight of $Li_{1.33}Ti_{1.67}O_4$, 5% by weight of Super-C (conductive material) and 5% by weight of PVdF (binder) were added to NMP to prepare an anode mix and the anode mix was applied to an aluminum current collector, followed by drying and pressing, to produce an anode. An electrode assembly was produced using the cathode, the anode and a porous separator made of polypropylene. Then, the electrode assembly was inserted into a pouch, a lead line was connected thereto, a solution of $_1M$ $LiPF_6$ in a mixed solvent consisting of ethylene carbonate (EC), dimethyl carbonate (DMC) and ethyl methyl carbonate (EMC) at a volume ratio of 1:1:1 was injected as an electrolyte and sealed to assemble a 9 bicell-type lithium secondary battery. Capacity of the battery was measured under 0.1 C charge, discharge conditions and an internal resistance (DC impedance) of the battery was measured at SOC of 50% for 10 seconds and averages of capacity and internal resistance are shown in Table 1 below.

TABLE 1

|  | Capacity (mAh) | Cell resistance (mOhm) |
|---|---|---|
| Ex. 1 | 592 | 1.52 |
| Comp. Ex. 1 | 584 | 1.67 |

As can be seen From Table 1 above, the battery of Example 1 exhibited superior capacity and low internal resistance, as compared to the battery of Comparative Example 1.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cathode active material comprising
a combination of a lithium manganese composite oxide having a spinel structure represented by the following Formula 3 with a lithium nickel composite oxide represented by the following Formula 2, wherein the oxide of Formula 3 is mixed with the oxide of Formula 2 in a weight ratio of 50:50 to 99:1, the cathode active material having a potential region (potential plateau) at 3.0 to 4.8V upon initial charge:

$$Li_xNi_yMn_{2-y}O_4 \quad \text{Formula 3}$$

wherein $0.9 \leq x \leq 1.2$, and $0.4 \leq y \leq 0.5$, and $$Li_{1+y'}Ni_{z'}M'_{1-z'}O_{2-z''}A'_{z''} \quad \text{Formula 2}$$

wherein $0 \leq y' \leq 0.1$, $0.5 < z' \leq 0.9$, and $0 \leq z'' < 0.2$;
M' is at least one selected from the group consisting of elements stable for 6-coordination; and
A' is at least one monovalent or bivalent anion.

2. The cathode active material according to claim 1, wherein the oxide of Formula 3 is $LiNi_{0.5}Mn_{1.5}O_4$ or $LiNi_{0.4}Mn_{1.6}O_4$.

3. The cathode active material according to claim 1, wherein the oxide of Formula 2 is represented by the following Formula 4:

$$LiNi_aMn_bCo_cO_2 \quad \text{Formula 4}$$

wherein $0.5 < a \leq 0.9$, $0 < b \leq 0.5$, $0 < c \leq 0.5$, $a+b+c=1$, and $c \leq b$.

4. The cathode active material according to claim 1, wherein the oxide of Formula 3 is provided as a secondary particle formed of agglomerated primary particles, wherein the secondary particle has a mean particle diameter (D50) of 2 to 30 μm.

5. The cathode active material according to claim 1, wherein the oxide of Formula 3 is mixed with the oxide of Formula 2 in a weight ratio of 80:20 to 95:5.

6. A secondary battery comprising the cathode active material according to claim 1.

7. The secondary battery according to claim 6, wherein the secondary battery comprises a lithium metal oxide represented by the following Formula 5 as an anode active material:

$$Li_aM'_bO_{4-c}A_c \quad \text{Formula 5}$$

wherein M' is at least one element selected from the group consisting of Ti, Sn, Cu, Pb, Sb, Zn, Fe, In, Al and Zr;
a and b are determined according to an oxidation number of M' within ranges of $0.1 \leq a \leq 4$ and $0.2 \leq b \leq 4$;
c is determined according to an oxidation number of A within a range of $0 \leq c < 0.2$; and
A is at least one monovalent or bivalent anion.

8. The secondary battery according to claim 7, wherein the lithium metal oxide is represented by the following Formula 6:

$$Li_aTi_bO_4 \quad \text{Formula 6}$$

wherein $0.5 \leq a \leq 3$ and $1 \leq b \leq 2.5$.

9. The secondary battery according to claim 8, wherein the lithium metal oxide is $Li_{1.33}Ti_{1.67}O_4$ or $LiTi_2O_4$.

10. The secondary battery according to claim 6, wherein the secondary battery is a lithium secondary battery.

* * * * *